No. 689,854. Patented Dec. 31, 1901.
E. M. COOK.
CREAM SEPARATOR.
(Application filed Mar. 11, 1901.)
(No Model.)
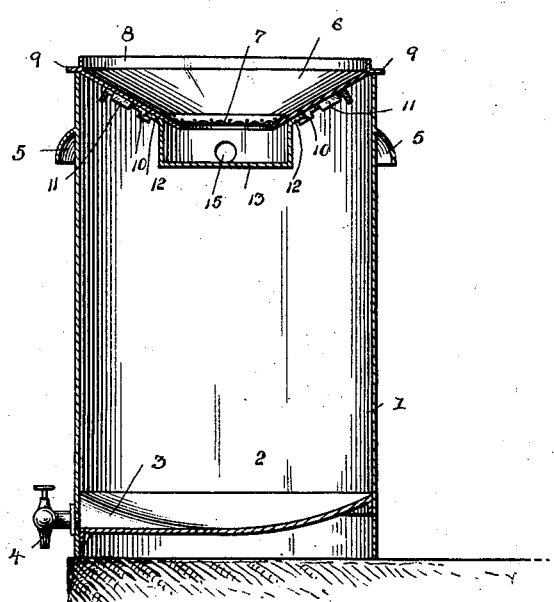
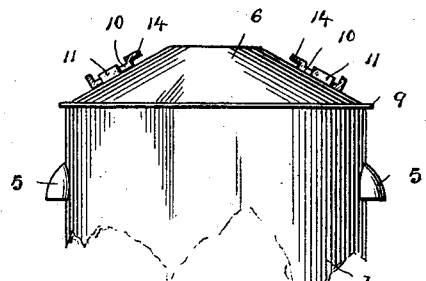
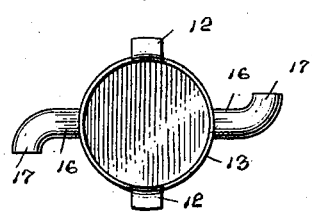
Witnesses
F. W. Riley
Geo. Ackeman
Inventor
E. M. Cook,
By Victor J. Evans. Attorney

UNITED STATES PATENT OFFICE.

EDWARD M. COOK, OF EAST BOSTON, MASSACHUSETTS.

CREAM-SEPARATOR.

SPECIFICATION forming part of Letters Patent No. 689,854, dated December 31, 1901.

Application filed March 11, 1901. Serial No. 50,726. (No model.)

*To all whom it may concern:*

Be it known that I, EDWARD M. COOK, a citizen of the United States, residing at East Boston, in the county of Suffolk and State of Massachusetts, have invented new and useful Improvements in Cream-Separators, of which the following is a specification.

This invention relates to certain new and useful improvements in cream-separators; and it has for its objects, among others, to provide a simple, cheap, and efficient portable cream-separator, by means of which a greater amount of cream can be obtained from a given amount of milk in a shorter period of time. I also provide for the drawing off of every particle of the milk and cream. I provide a cover having a strainer portion, beneath which is designed to be detachably secured a tube or receptacle having extending from opposite sides thereof tubes communicating therewith and extending so as to cause a thorough mixing of the water with the milk without the necessity of agitating the contents of the separator by rotation thereof. I form the bottom with a gutter running from the center to the faucet, so as to allow of the drawing off of every drop of the cream.

Other objects and advantages of the invention will hereinafter appear, and the novel features thereof will be particularly pointed out in the appended claim.

The invention is clearly illustrated in the accompanying drawings, which, with the numerals of reference marked thereon, form a part of this specification, and in which—

Figure 1 is a substantially central vertical section through my improved cream-separator. Fig. 2 is a perspective view of the upper portion of the can with the covering placed thereon. Fig. 3 is a plan view of the detachable receptacle with its tubes.

Like numerals of reference indicate like parts throughout the several views.

Referring now to the details of the drawings, 1 designates the can or receptacle, which may be of any desired shape, material, and capacity, and in this instance I have shown the bottom 2 thereof as separately formed, although this is not essential; but the bottom should be concaved, as indicated in Fig. 1, with a gutter or channel 3 running from the center thereof to the wall of the can, as indicated, so that the entire contents may be withdrawn through the faucet 4. It will be understood that the inner end of the faucet communicates with the bottom of the gutter or channel, as shown, so that every drop of the liquid may be withdrawn therethrough. The can or receptacle 1 is shown as provided with suitable handles 5, by which it may be manipulated.

6 is the lid or cover, preferably of substantially the form shown, that of truncated cone, and provided with a screen 7, of a character usually employed in such devices. This lid or cover is provided with an annular depending flange 8 and an annular horizontal flange 9, the former being designed to extend within the can or receptacle and the latter to engage the upper edge of the can-body in both positions of the lid or cover. This lid or cover is provided upon the outer inclined walls thereof with suitable sliding plates or bolts 10, movable through suitable guides or keepers 11 on the cover, as shown, and the bolts may be moved to engage the flanges 12 on the receptacle 13, as seen in Fig. 1, or these bolts or plates may be rigid and the receptacle secured in place by bringing its flanges beneath the offsets 14 in said bolts or plates by a partial rotary movement of the receptacle with reference to the bolts. In either instance it will be noticed that the receptacle is detachable from the cover for the purpose of cleaning or repairs or other causes.

The receptacle 13 is provided with the outlet-openings 15, opposite which are affixed the tubes 16, as seen best in Fig. 3, and said tubes have their other ends bent, as at 17, and these bent ends extending in opposite directions, as shown clearly in said Fig. 3, so as to cause the water and milk to be forced around the inner wall of the can, and thus cause a more thorough mixing of the milk and water.

The operation is as follows: Milk is poured into the hopper formed by the lid or cover when the latter is placed in its inverted position, as seen in Fig. 1, and the milk will pass through the strainer into the receptacle and out through the tubes into the can. The same quantity of water is now poured in through the hopper, and it passes through the strainer into the receptacle and through the tubes into the can, the curvature of the tubes causing the water to flow in such a manner as to thoroughly mix the same with the milk. It will take the cream about thirty minutes to rise on the milk, when the latter is drawn off through the faucet in the usual manner.

The simplicity of the separator hereinabove described, its cheapness, and the ease of operation render it a most complete device for the purpose of separating the constituents of the milk, and while the embodiment of the invention as herein disclosed is what I believe at this time to be preferable I do not wish to restrict myself to the exact details of construction herein disclosed, as the same are subject to changes, variations, and modifications without departing from the spirit of the invention or the scope of the protection prayed.

What I claim as new is—

In a cream-separator, the combination with a can, of a reversible cover in the form of a truncated cone having an annular depending flange and an annular horizontal flange, a strainer at the top of the cover, radially-disposed bolts slidably supported on the outer side of the cover, and a receptacle having oppositely-projecting discharge-pipes, and an annular beveled flange adapted to overlap the conical surface of the cover, and be engaged by said bolts.

In testimony whereof I affix my signature in presence of two witnesses.

EDWARD M. COOK.

Witnesses:
FRANK M. DIMICK,
J. P. M. DIMICK.